United States Patent [19]

Pioth

[11] 4,175,783
[45] Nov. 27, 1979

[54] STRETCHER

[76] Inventor: Michael J. Pioth, 5900 Center Rd., Valley City, Ohio 44280

[21] Appl. No.: 875,674

[22] Filed: Feb. 6, 1978

[51] Int. Cl.² ............................................. A61G 3/00
[52] U.S. Cl. ..................................... 296/20; 188/1 C
[58] Field of Search ................... 296/19, 20; 5/63, 64, 5/67, 68; 188/1 D

[56] References Cited

U.S. PATENT DOCUMENTS

| | | | |
|---|---|---|---|
| 2,110,227 | 3/1938 | Koenigkramer | 188/1 D |
| 3,304,116 | 2/1967 | Stryker | 296/20 |
| 3,341,246 | 9/1967 | Lavallee | 296/20 |
| 3,608,102 | 9/1971 | Goodman | 5/63 |
| 3,820,838 | 6/1974 | Limpach | 296/20 |

Primary Examiner—Joseph F. Peters, Jr.
Assistant Examiner—John A. Carroll
Attorney, Agent, or Firm—T. A. Te Grotenhuis

[57] ABSTRACT

A stretcher having a bed portion or patient supporting surface carried by a chassis portion having a frame comprising laterally spaced longitudinal tubular members of rectangular cross section running longitudinally and horizontally the length of the stretcher and horizontal members one of which is welded perpendicular to each end of the two longitudinal members and extends equidistantly beyond each of the longitudinal members. At each end of the horizontal members is a castor wheel assembly carried rotatably in a swivel frame. The main feature of the present invention is a hydraulically actuated brake shoe that is controllably moveable toward and away from the castor wheel. The shoes have a cylindrical portion and are cup-like with an outwardly flared peripheral lip. The shoes are carried in an inverted manner with the cylindrical portion concentric with the axis of swivel. The flared peripheral lip terminates in an annular downwardly extending portion of a radius no greater than the radius of swivel of the axis of the wheel so that when the shoe is pressed against the wheel the downwardly extending portion will indent the tire of the wheel.

1 Claim, 10 Drawing Figures

STRETCHER

SUMMARY OF THE INVENTION

This invention is directed to an improved stretcher (sometimes called a Gurney) for hospital and nursing home use. The stretcher improved brakes and superior ease of handling during transporting and transferring patients from bed to stretcher and vice versa.

The predominate feature of my invention is the downwardly extending portion of the flared lip of the cup-like brake shoes. This prevents the slippage during patient transfer had when flat portions only bear against the tire. The downwardly extending portion is the annular terminus of the flared lip of the cup-like brake shoe and has a radius no greater than the radius of swivel of the center of the wheel.

THE PRIOR ART

The prior art found shows a stretcher with inverted cup-like brake shoes having a flaired peripheral lip that bears against the upper surface of the tire, However in that art the lip bears flately against the tire when brakes are applied and slippage may occur during the delicate transfer from bed to stretcher and vice versa. The closest are found is U.S. Pat. No. 2,110,227.

The hydraulically operated brakes have a brake shoe for each wheel, which shoe has an inverted cylindrical cup portion with a downwardly and outwardly flared lip carried concentrically with the vertical axis of swivel of the swivel frames of the castor. The lip portion has less of a radius than the radius of swivel of the axis of the castor wheel so that the lip jams into the tire of the castor wheel when brakes are applied.

It is an object of the present invention to provide a stretcher or hospital-patient transport device heating improved flexibility and safety features.

Other objects will be apparent from the description of the device as illustrated by the accompanying drawings in which.

Referring more particularly to the drawings where like parts are designated by like numerals of reference throughout the several views, the stretchers of the present invention comprise a chassis portion 1 and a patient-receiving top or bed portion 2. The bed portion comprised a head portion 3 and and a foot portion 4 for respectively receiving the head and foot portions of the patient. The top portion 2 has a pad 5 of sponge rubber or the like overlying the flat table 6 of suitable metal or the like. The table and pad are of a length and width sufficient to overlie the entire chassis 1.

The chassis 1 has a rigid frame which comprises two longitudinally extending laterally spaced members 7a and 7b respectively. These members are preferably tubular and of square or rectangular cross section and extend substantially the length of the stretcher. Members 7a and 7b have attached, preferably by welding, at their end portions members 8a and 8b. These cross members are also preferably of rectangular section and are substantially coextensive with the width of the stretcher.

Welded to member 7a and cross member 8b at an angle formed by these members is a mounting plate 9a. Similarly welded to cross member 8a and to member 7b is a mounting plate 9b. These plates carry hydraulic units as hereafter identified. Each of the end portions of the cross members 8a and 8b are provided with means to removably carry a stub shaft 11 on which castor wheel assemblies are swivelably mounted. Such means includes a plug 10 welded into the end portions, which plug with the bottom wall of the tubular cross member is suitably drilled or bored to receive the shaft 11 therein. A set screw 18 is suitably threaded into the plug to hold the shaft 11.

Each castor assembly 12 comprises a swivel frame 13, the lower portion of which has arms 14a and 14b spaced to receive the castor wheels 15, which are rotatably carried on the bolts 16. The upper portion of the frame has a cylindrical portion 17, which serves as a housing for a bearing (not shown) journalled on the stub shaft 11.

Removably but rigidly carried by the frame near each end thereof is one of two tubular (preferably cylindrical) vertical hydraulic cylinder housings 20 which vertically support and carry a hydraulic elevator cylinder 19 therein, for controlling the elevation of the bed portion of the stretcher with respect to the chassis. The cylinders 19 are preferably about concentric with the housing 20. A piston 21 is slidably carried in the cylinder 19 to be moved up or down in accordance with controlled increase or decrease of fluid pressure in the cylinder.

Figure 6:
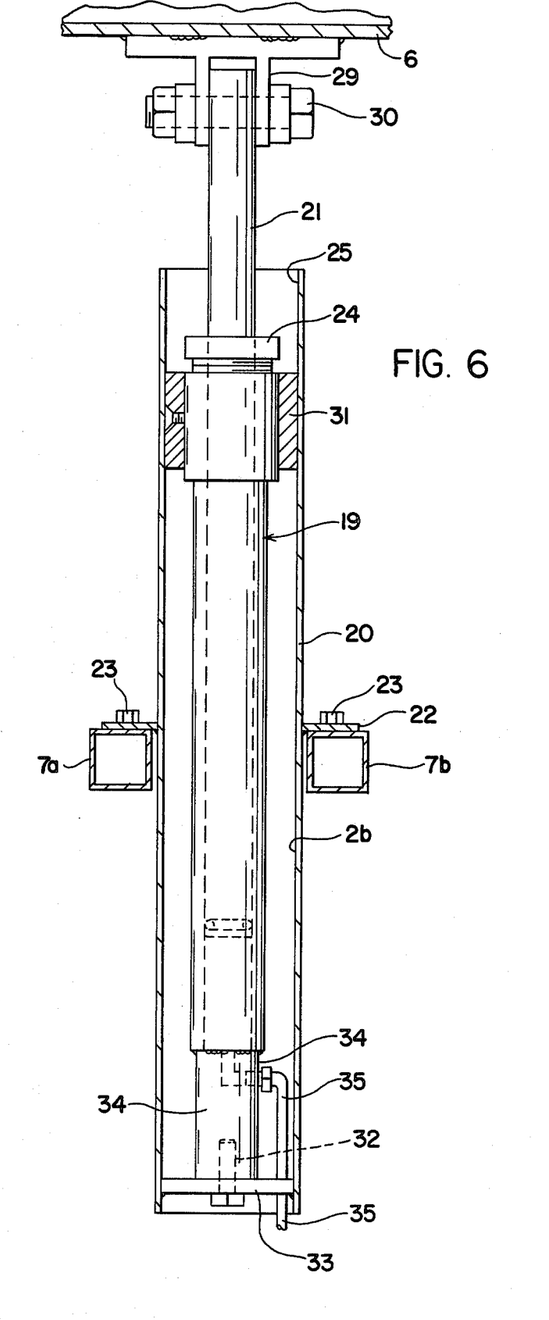
FIG. 6 is a view partly in section, generally on the line 6—6 of FIG. 3.

As shown particularly by FIG. 6, the cylinder housings 20 are of much greater diameter than the diameter of the hydraulic cylinders 19 contained therein and extend upwardly beyond the top of cylinder 19 and preferably even beyond the piston seal portion 24 to form a chamber outlined by the inner walls 25 to a catch any leakage of hydraulic fluid through the seal. The chamber 26 formed by the inner walls of the housing 20, the outer walls of the cylinder 19, and the bottom plate 33 may be used as a reservoir for hydraulic liquid 27. A suitable passageway (not shown) may be provided to permit passage of leaked hydraulic fluid into this reservoir.

Each of the pistons 21 respectively underlying the head and foot portions of the top portion 2 are pivotally connected to its respective head and foot portions as shown by the channel 29 which is welded to the table 6 and the bolt 30. Each of the housings 20 has welded perpendicularly to its outer surface intermediately to its ends a mounting plate 22 through which the housing protrudes. Bolts 23 through the plates 22 attach each of the housings to two longitudinal members 7a and 7b and to one of the cross members 8a or 8b of the frame.

The inner hydraulic cylinder 19 is supported against any movement with respect to the housing 20 by the sleeve 31 and the bolt 32, which is attached both to the plate 33 and the closed end 24 of the cylinder 19. Means such as the tube 35 which has a passageway through the plate 33 and the closed end 34 of the cylinder 19 is provided for ingress and egress of fluid into the cylinder below the piston.

It is found, in accordance with one aspect of this invention, that by having a hydraulic cylinder supported by and within a large diameter tubular housing 20, one obtains the the rapid changes in elevation inherent only with a hydraulic cylinder of small diameter while still getting the lateral stability required and inherent in large diameter cylinders.

During the transfer of patients the wheel brakes must positively stop the wheels of the stretcher. The brake system of my stretcher is hydraulically actuated and is adapted to stop and hold all four wheels when brakes are applied. I have found that the shape of the brake shoes is extremely important. The brake shoes have an inverted generally cylindrical cup-shaped portion with a downwardly projecting flared perpheral lip portion 37 having a peripheral edge 38 to jab into the tire 41 of the wheels 15. The cylindrical portion of the shoes 36 is concentric with and overlies the bearing retaining portion 17 of the swivel frame. The shoes 36 are preferably provided with two upstanding ears 42 having inwardly projecting flange portions 43.

Spring means such as the springs 44 that bear against the lower surfaces of the flanges 43 and the upper surface of the housing 17 of the castor frame are provided to normally hold the lips 38 away from the tires. The radius of the flared lip of the brake shoes is less than the radius of the castor i.e. the distance of the axis of the castor wheel from a line through the axis of the stub shaft 11 (the radius of swivel). The cylindrical portion 36 of the brake cups is provided with a boss 45 bored to receive the end 46 of the brake actuating bar 47 which connects the two brake shoes at the head an foot ends respectively of the chassis. One of the hydraulic brake cylinders 39 having a body portion carried by frame cross member 8a at the center thereof and a piston adapted to bear against an actuating bar 47 actuates the brakes at the head portion of the stretcher and the other brake cylinder similarly carried by frame cross member 8b and having a piston to bear against the other actuating bar 47 actuates the brakes at the foot portion of the stretcher. Both brake cylinders 39 act in cooperation with spring means 44 as means for controlling the movement of actuating bars 47 and movement of the brake shoes toward and away from the tires 41.

One of the three hydraulic pumps 50 is carried by mounting plate 9a at the under side thereof. Each of the pumps 50 have a piston 51 normally held in an extended position by the spring 52 and a suitable valve controlled inlet 53 to permit fluid to enter the chamber of the cylinder when the piston is being extended and to prevent reverse flow. In the case of the brake pump, the inlet tube 54 is connected to the cylinder carried by mounting plate 9a and actuated by brake pedal 55. The pedal 55 has an actuating arm 56 pivotally carried by the spaced flanges 57 attached to the cross member 8b. Downward pressure on the pedal compresses the piston 51 to force hydraulic fluid into the brake cylinders 39.

Figure 7:
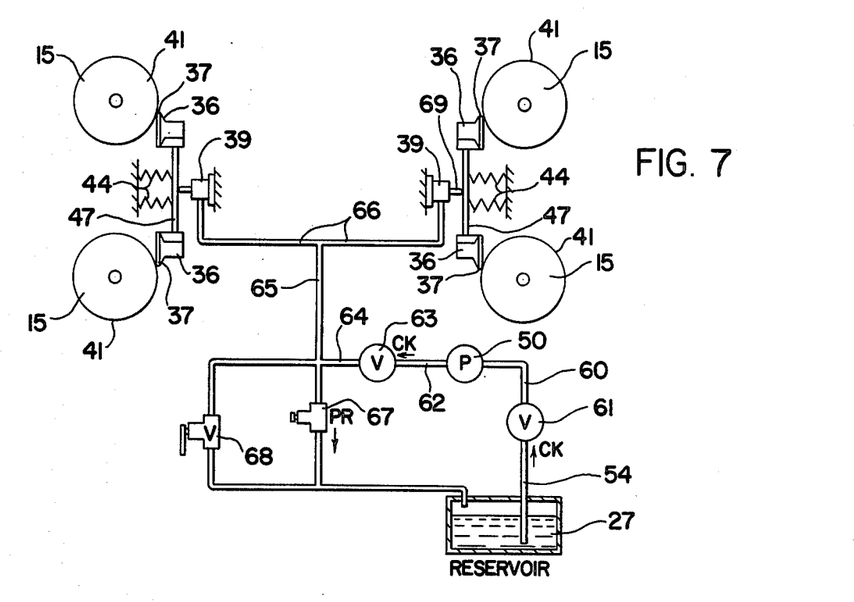
FIG. 7 is a schematic view of the system for hydraulic braking of the wheels of the device.

Referring particularly to FIG. 7 the brake system comprises a reservoir for hydraulic fluid 27, which reservoir is preferably within one of the housings containing an elevator-cylinder 19; the pump 50, the inlet of which is connected through the conduit 60 and the inlet valve 61 to the reservoir containing hydraulic fluid 27 and the outlet of which is connected through the conduit 62 successively to the check valve 63, the conduits 64, 65, and 66 to the hydraulic brake cylinders 39. A pressure relief valve 67 is provided to by-pass fluid back to the reservoir when excessive pressure is exerted by the pedal 55. Brake release is provided by the control valve 68, which when open permits relief of pressure in the system and retraction of the piston 69 of the cylinder 39 and movement by the springs 44 of the brake shoes away from the the tires 41 thus permitting the wheels to turn.

Two pumps 50 are carried on the under side of plate 9b to control elevation of the bed portion of the stretcher. The pistons 51 of each of these pumps are simultaneously actuated by the pedal 70 which is pivotally attached to the flanges 71 carried on the transverse member 8b of the frame.

Figure 8:
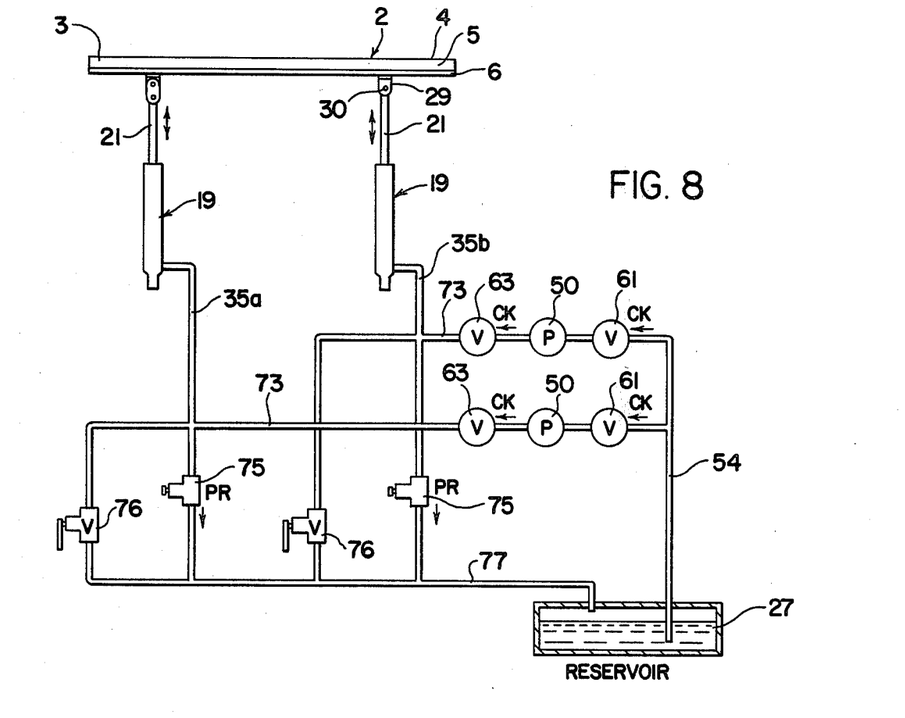
FIG. 8 is a schematic view of the hydraulic system for controlling the elevation of portions of the bed or upper surface portions of the stretcher.
Figure 9:
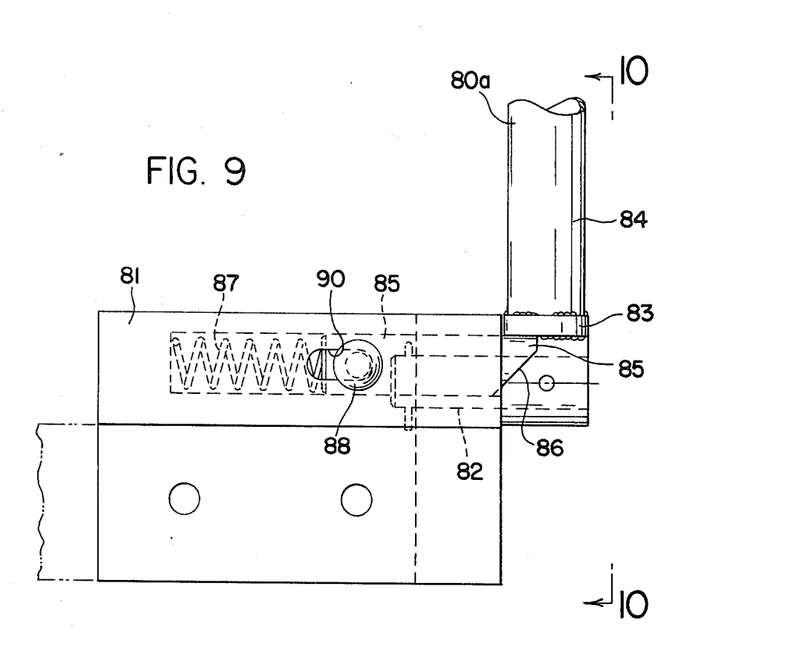
FIG. 9 is an enlarged view of the side rail locking device of the stretcher as seen from line 9—9 of FIG. 1.
Figure 10:
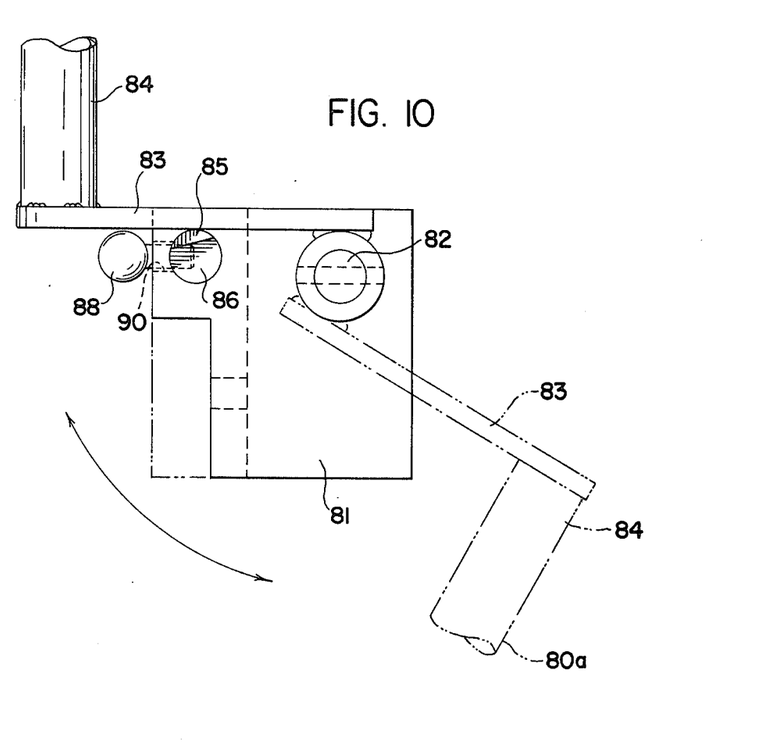
FIG. 10 is an end view of the portion shown in FIG. 9.

As shown more particularly by FIG. 8, the hydraulic system for controlling the the height of the bed portion of the stretcher comprises two pumps 50 each of which comprises a one way inlet check valve 61 connected to the reservoir for hydraulic fluid 27 and an outlet check valve 63 to permit passage of fluid only in a direction away from the reservoir. The outlet of one of these pumps 50 is connected through the conduits 73 and 35a to the hydraulic elevator cylinder under head portion 3 of the top 2. The outlet of the other pump 50 is connected to the elevator cylinder 19 under the foot portion of the top 2. An adjustable relief valve 75 and a control valve 76 are connected in parallel into conduit 35b for respectively relieving excessive pressure applied to cylinder 19 and for controlling the fluid in that cylinder under the foot portion of the bed. The fluid relieved thru the valve 75 as well as that which passes through valve 76 is returned to the reservoir via conduit 77. Similarly relief valve 78 and control valve 79, which are connected into conduit 35a, respectively relieve and and control fluid pressure in the cylinder 19 under the head portion of the stretcher.

Figure 1:
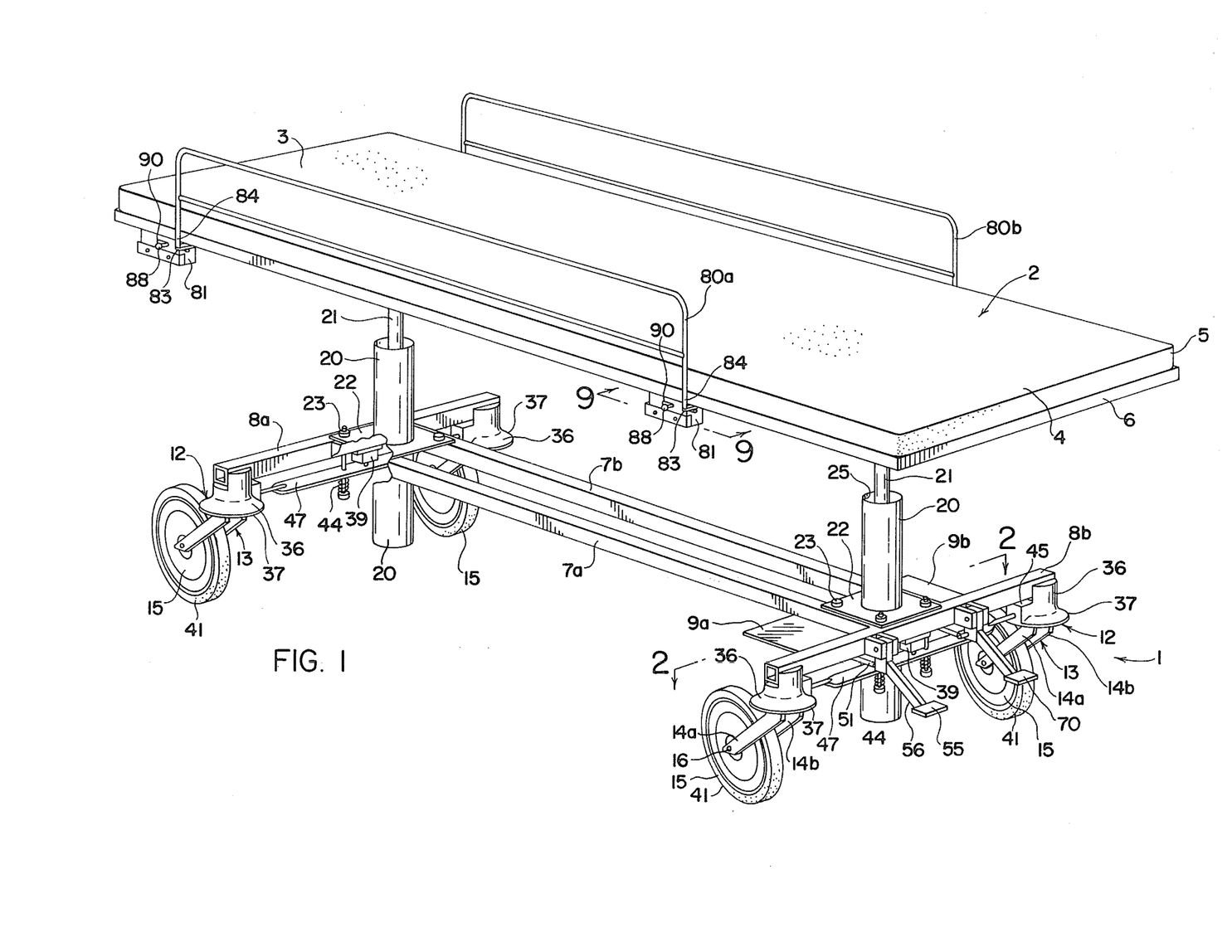
FIG. 1 is a perspective view of a stretcher embodying the invention.
Figure 2:
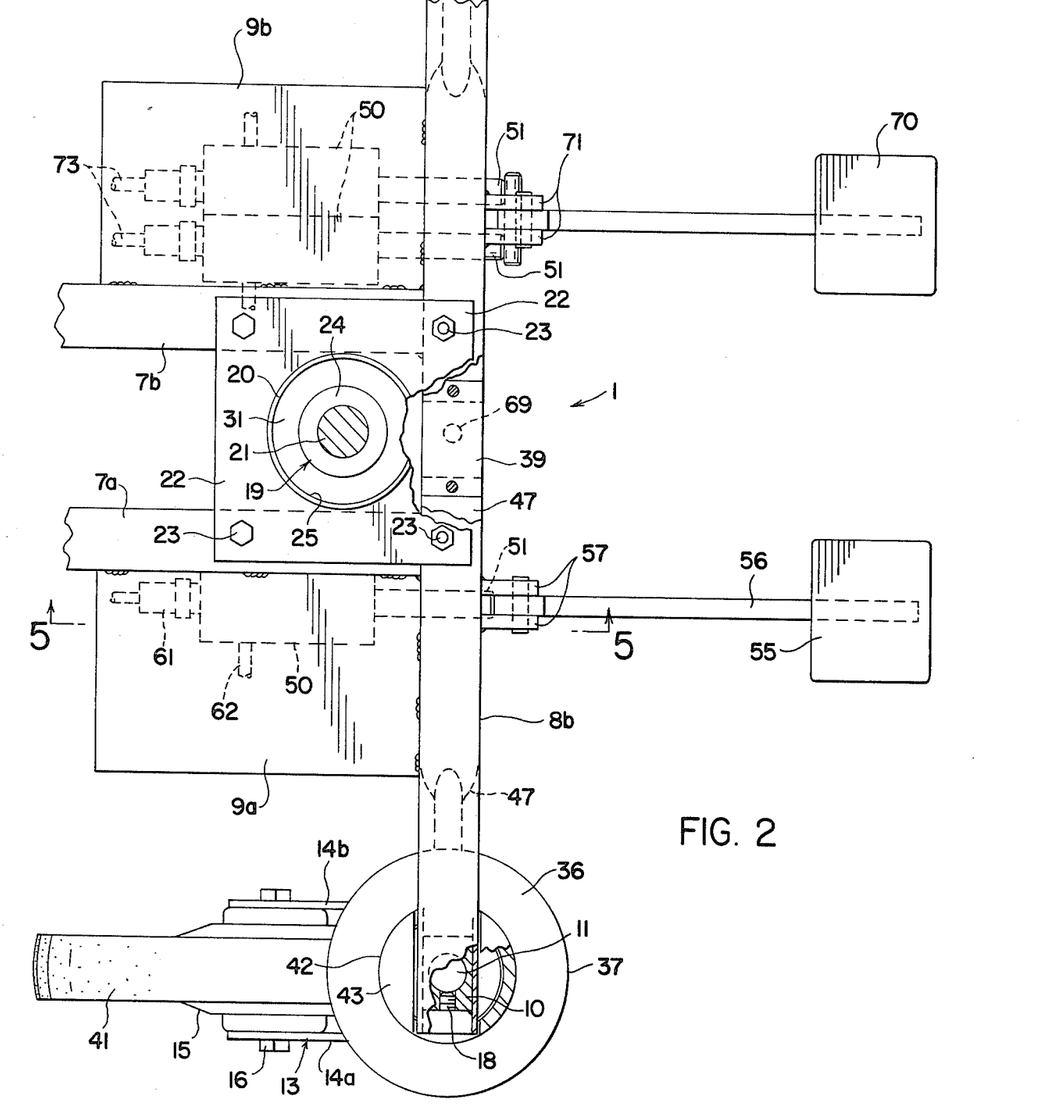
FIG. 2 is a plan view of a portion of the device as seen from the line 2—2 of FIG. 1 looking in the direction of the arrows shown.
Figure 3:
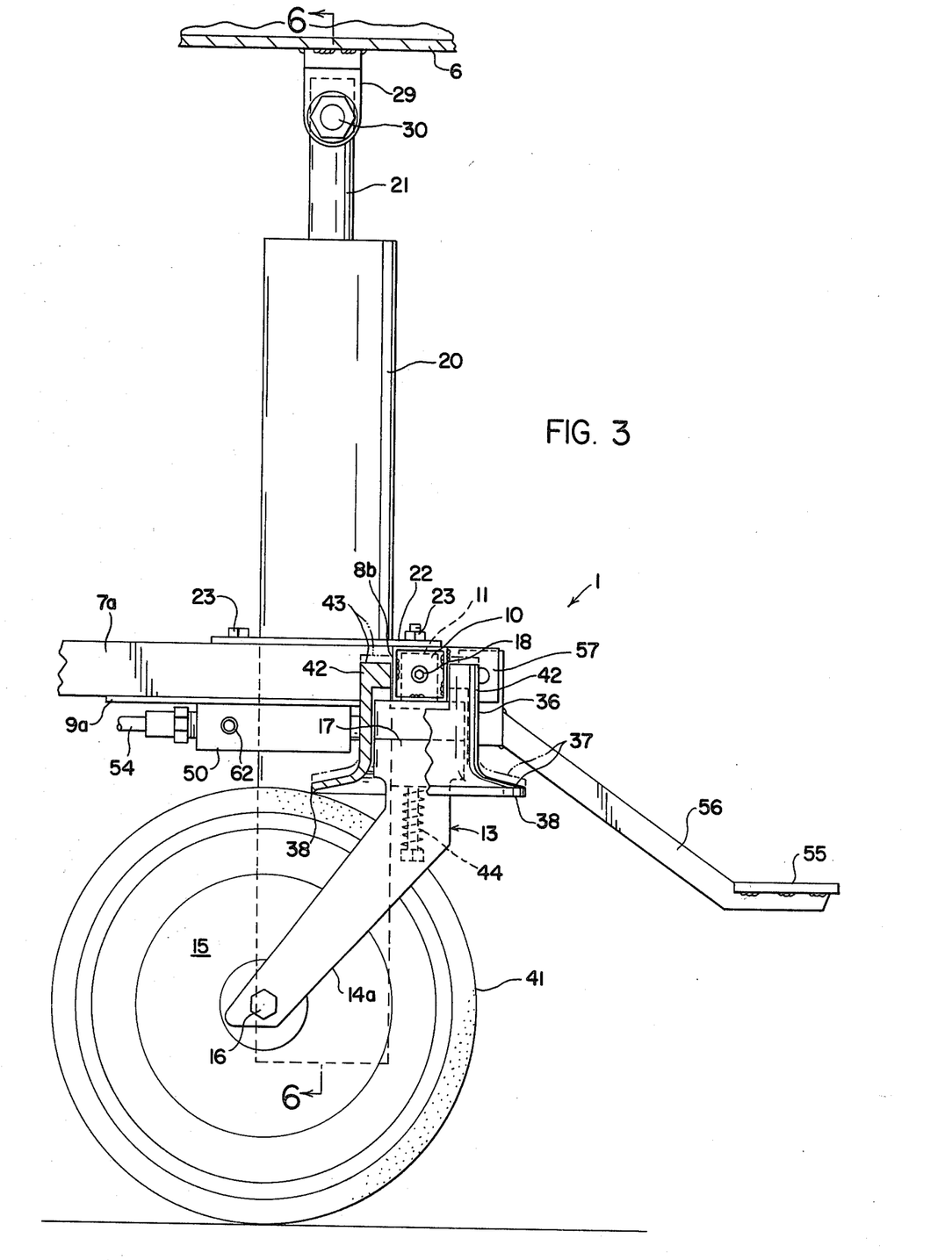
FIG. 3 is a side elevational view of the portion shown in FIG. 2.
Figure 4:
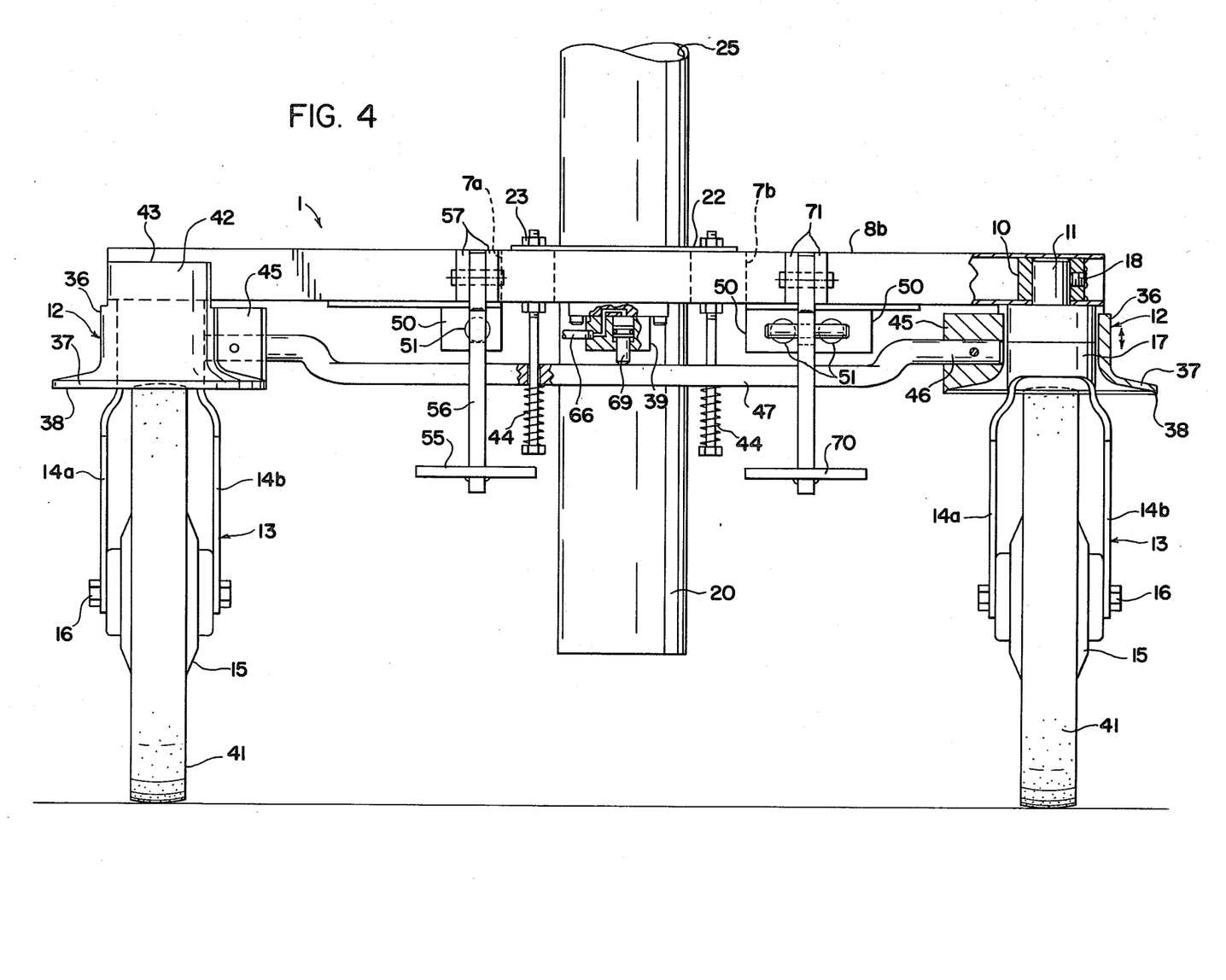
FIG. 4 is an end elevational view of the portion in FIG. 2.
Figure 5:
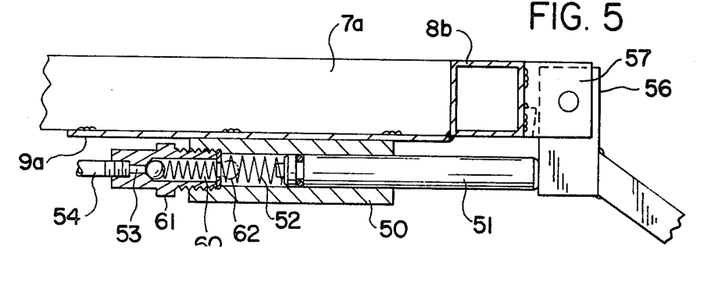
FIG. 5 is a view, partly in section, of a portion of the device as seen from the line 5—5 of FIG. 2.

The side rails 80a and 80b are pivotably carried by the rigid table portion 6 at the side edges therefor. Suitably bored mounting blocks 81 are welded to the side edges of the table portion. These blocks support the pivot pins 82 to which arms 83 carrying the ends ends 84 of the side rails 80 are attached. A latch bolt 85 having a tapered face 86 is normally pressed outwardly by spring 87, but is slidable inward by pressure exerted against the spring 87 through the control nob 88 which is rigidly attached to the latch bolt 85 and is slidable in the slot 90. One is able to lower the side rails by applying pressure to the nob 88 to slide back the latch. When the rails are raised they automatically lock into the position shown in FIG. 1.

It is understood that modifications may be made in the invention without departing from the spirit thereof and that it shall only be limited by the appended claims.

I claim:

1. In a stretcher suitable for supporting and transporting patients in hospitals and the like comprising a chassis and a bed portion overlying said chassis and carried by said chassis, said chassis having (1) a frame comprising two laterally spaced longitudinal members of rectangular cross-section running longitudinally and horizontally the substantial length of the stretcher and horizontal cross members also of rectangular cross section one of which is welded perpendicular to and at each end of said longitudinal members, said cross members extending equidistantly beyond the two longitudinal members, and (2) a castor wheel assembly rotatably carried in a swivel frame, carried at each end of each cross member, and (3) brake means which comprises four inverted cup-like brake shoes, one to bear against each wheel, each of said brake shoes having a cylindrical portion concentric with the axis of swivel of one said castor wheels and a flared perpheral lip that overlies a tire, suitable spring means to normally hold said brake shoes in an upward position away from said tire, and hydraulic means for controllably moving each of said brake shoes toward the tire that it overlies, the improvement which comprises an annular downwardly extending portion that is the outer annular terminus of said perpheral lip of said brake shoes, said downwardly extending portion having a radius that is no greater than the radius of swivel of the center of said wheels.

* * * * *